March 5, 1968 C. H. TOLMAN 3,372,387
DIGITAL TO ANALOG CONVERTER
Filed Sept. 9, 1964
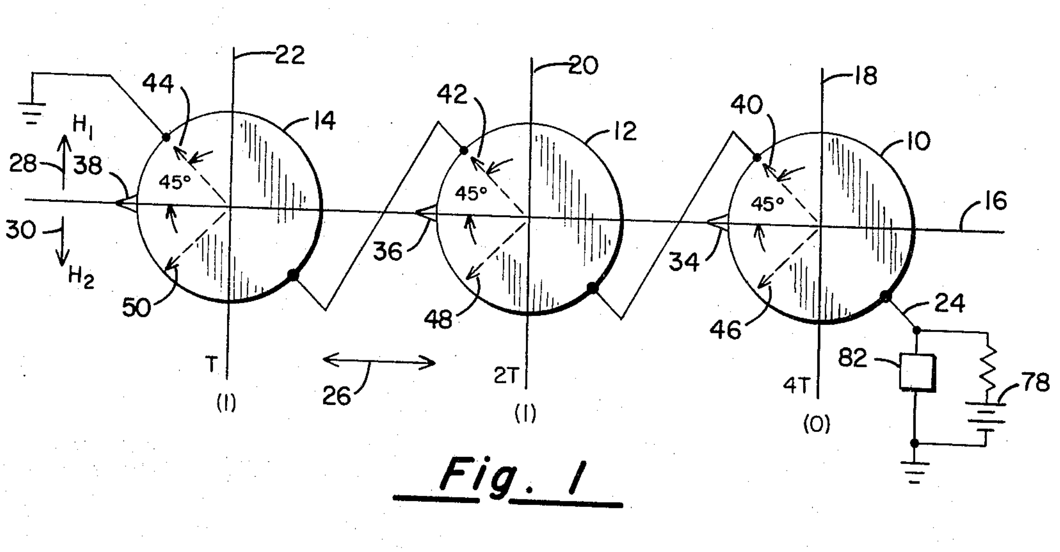
Fig. 1
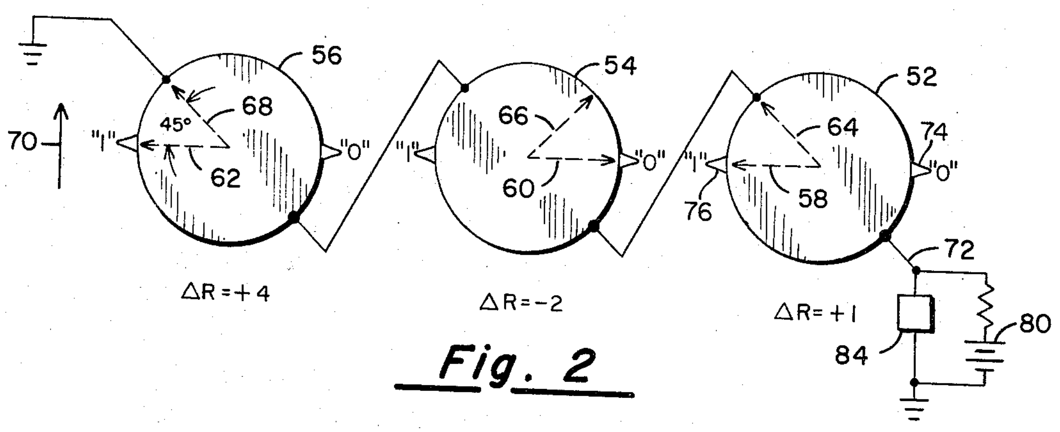
Fig. 2
| STORED NUMBER | | READOUT ΔR ARBITRARY UNITS | OUTPUT IF +7 UNITS ADDED |
|---|---|---|---|
| BASE 2 | BASE 8 | | |
| 000 | 0 | −4−2−1= −7 | 0 |
| 001 | 1 | −4−2+1= −5 | +2 |
| 010 | 2 | −4+2−1= −3 | +4 |
| 011 | 3 | −4+2+1= −1 | +6 |
| 100 | 4 | 4−2−1= +1 | +8 |
| 101 | 5 | 4−2+1= +3 | +10 |
| 110 | 6 | 4+2−1= +5 | +12 |
| 111 | 7 | 4+2+1= +7 | +14 |
Fig. 3
INVENTOR.
CHARLES H. TOLMAN
BY Thomas J. Nikolai
ATTORNEY

United States Patent Office 3,372,387

Patented Mar. 5, 1968

3,372,387

DIGITAL TO ANALOG CONVERTER

Charles H. Tolman, Bloomington, Minn., assignor to Sperry Rand Corporation, New York, N.Y., a corporation of Delaware Filed Sept. 9, 1964, Ser. No. 395,137
5 Claims. (Cl. 340—347)

ABSTRACT OF THE DISCLOSURE

A D/A converter or code translator which utilizes magnetic thin films whose resistance varies when their magnetic vectors are rotated, whose thickness forms a geometric progression T2, T4, etc., and whose resistance changes also form a geometric progression. For *n* thin films there will be *n* discrete resistance changes or evenly spaced voltage levels produced on the output line as the magnetic vectors are rotated.

The present invention relates to magnetoresistive apparatus and method for reading out the information stored in a number of magnetic film elements and to display this information in number systems of base 4, 8, 16, etc., rather than base 2. The base of the system depends upon the number of films. More specifically the property of magnetoresistance is utilized to provide discrete voltage change levels representative of the information stored in a number of film elements.

It is old and well known that the electrical resistivities of iron and nickel change when they are magnetized. See Bozorth, Ferromagnetism, chapter 16, "Magnetism and Electrical Properties," page 745, D. Van Nostrand Co., Inc., Princeton, N.J., 4th printing, 1956. This change in resistivity resulting from the application of a magnetic field in a material in question is known as magnetoresistance and the resistance is found to be a maximum when the angle between the resistance measurement sense line and the magnetization vector is 0 and is a minimum when the angle is 90°.

Recently the magnetoresistive effect was extended to magnetic thin films being used as a memory device. See Electronic Design, "Magnetoresistive Readout for 200-Nsec TF Memory," Mar. 15, 1962, and 1962 International Solid State Circuits Conference, Digest of Technical Papers, "Magnetoresistive Readout of Thin Film Memories," page 36. A thin film is generally defined as a ferromagnetic element having single domain properties. The term "single domain property" may be considered the characteristic of a three dimensional element of magnetic material having a thin dimension which is substantially less than the width and length thereof wherein no domain walls can exist parallel to the large surface of the element.

In the preferred embodiment of this case, the thin film as defined above possesses the characteristic of unaxial anisotropy providing an easy axis along which the remanent magnetization vector lies and, further, has substantially rectangular hysteresis loop characteristics.

In the above publications it is disclosed that the electrical resistance of a magnetic film depends on the space angle between the resistance measuring sense line connected to the film and the direction of magnetization. This resistance has been found to be a maximum when a sense line connected to the film and the film remanent magnetization vector are parallel or anti-parallel and a minimum when the sense line and the remanent magnetization vector are perpendicular to each other. By determining the polarity of the output pulse appearing on the resistance measuring sense line resulting from the change in resistance upon the application of a drive field, the "state" of the element, i.e., a "one" or a "zero," can be determined.

It is also well known that the resistance of a thin film varies according to the thickness of the film. Thus, if the film thickness is decreased, resistance increases. However, it has been found that the ratio of the change in resistance to the total resistance of the film remains constant regardless of the thickness of the film. That is, the magnitude of both the resistance change and the resistance of the film varies with the thickness of the film but the ratio of the resistance change to the total resistance will remain constant regardless of the thickness of the film.

The present invention makes use of the fact that the resistance of the film varies with the thickness by utilizing a series of films the thickness of which form a geometrical progression. The resistance changes realized by the films when their magnetization vectors are rotated will also form a geometrical progression.

It is therefore apparent that for *n* thin films there will be *n* discrete resistance changes or evenly spaced discrete voltage levels produced on the output line otherwise known as the resistance measuring sense line. The device therefore is either a digital-to-analogue converter, or a code translator which converts directly from binary or the base 2 to the base $2^n$. It is a considerable improvement over code translators such as found in Patent Number 2,920,317 or the digital-to-analogue converter disclosed in Patent Number 2,718,634 since it requires much less apparatus, much less power consumption and is considerably less complex.

Thus it is an object of the present invention to provide apparatus for reading out information stored in the number of magnetic film elements, and to display this information in number systems of base 4, 8, 16 and so forth, rather than base 2.

It is also an object of this invention to utilize the thickness of a thin film to provide discrete voltage change levels representative of the information stored in the film elements.

It is still another object of this invention to utilize the magnetoresistance effect to determine the information stored in a number of thin films and to display this information in a number system that is more convenient than the presently used base 2 system.

It is yet another object of this invention to provide a device which will provide direct readout of stored binary information in the octal system without intermediate conversion means.

For a more complete understanding of the invention these and other more detailed and specific objects will be disclosed in the following specification, reference being had to the accompanying drawings in which like numerals indicate like elements in the various figures of the drawings and in which:

FIG. 1 shows a typical arrangement of three films with read and write lines, together with the magnetoresistive sense line.

FIG. 2 shows an arrangement of three films coupled to the magnetoresistive sense line wherein the thickness of the films is chosen such that a geometrical progression exists.

FIG. 3 is a table showing the information stored in the three films of FIG. 2 in terms of the base 2 and base 8 systems as well as the magnitude of the magnetoresistive readout of the stored numbers.

The phenomenon of magnetoresistance in magnetic elements displaying single domain properties can be described as a rotation of the magnetization causing a change in the electrical resistance of the material. The application of a magnetic field or the application of a stress to a magnetostrictive film element will in general cause a rotation of the magnetization. It has been established that the ohmic resistance R of a film can be expressed by the equation (see Bozorth, page 754):

$$R=(R_0-R_1)\cos^2\theta+R_1 \quad (1)$$

where $R_0$ and $R_1$ are constants of the magnetic material, $R_0$ being the maximum resistance of the element and $R_1$ being the minimum resistance of the element. The angle $\theta$ is the angle between the magnetization of the film and the direction of resistance measurement.

As can be seen from Equation 1, when the magnetization is parallel to the direction of resistance measurement so that $\theta=0°$ or 180°, Equation 1 reduces to $$R=R_0 \quad (2)$$

and the resistance is a maximum. However, when a magnetization is perpendicular to the direction of resistance measurement and thus $\theta=90°$ or 270° Equation 1 reduces to $$R=R_1 \quad (3)$$

and the resistance is a minimum.

The relationships expressed in Equations 1, 2 and 3 above apply even though the thicknes of the films may vary. However, the magnitude of the values expressed in Equations 1, 2 and 3 above will vary as the thickness of the film varies. That is, total resistance (R) may either increase or decrease and the total change in resistance $\Delta R$ may increase or decrease. However, for any individual film the ratio of the change in resistance to the total resistance of the film will always be constant for a given film material ($\Delta R/R$=constant).

Referring now to FIG. 1 there is shown a typical arrangement of three films 10, 12 and 14 with read line 16, write lines 18, 20 and 22 and the magnetoresistive sense line 24. The films 10, 12 and 14 have an easy axis of magnetization 34, 36 and 38 respectively in the direction represented by the double headed arrow 26. The thickness (T) of the films 10, 12 and 14 is chosen so that a geometrical progression with a ratio of 2 describes their thickness as follows $$T_{10}=2T_{12}=4T_{14}=2^{n-1}Tn \quad (4)$$

It will be noted that the sense line 24 is removed 45° from the easy axis of each of the films 10, 12 and 14. Assume now that a pulse of the proper polarity is applied to read line 16 which will produce a transverse magnetic field $H_1$ as indicated by vector 28 in the direction shown. Assume also that the pulses are of such a magnitude as to be able to rotate the magnetic vectors of each of the films 45°. It will be seen that each of the magnetic vectors 34, 36 and 38 will be aligned in a direction of the resistance measurement sense line 24 as represented by the dotted vectors 40, 42 and 44 respectively. As expressed by Equation 2 above, the resistance of each of the films will then be a maximum.

Assume next that the magnetic vector of each of the films is in its rest state and that a pulse of the proper polarity is applied to read line 16 sufficient to cause a magnetic field $H_2$ in a direction shown by magnetic vector 30 and of sufficient amplitude to cause the magnetic vectors 34, 36 and 38 to rotate counterclockwise 45° to the position shown by vectors 46, 48 and 50. In this position the magnetic vectors are perpendicular to the sense line 24 and, as expressed in Equation 3 above, the resistance of each of the mangetic thin films is a minimum. As explained previously the fractional change in resistance $\Delta R/R$, by means of the magnetoresistive effect, is independent of film thickness; however, the magnitude of the resistance change, $\Delta R$, is dependent on film thickness. By choosing different film thicknesses, different resistance changes are realized in each film when the magnetization is rotated. Therefore, upon readout the total output observed on a sense line is a measure of the state of all the films linked by the sense line. Since the thickness ratio of the three films 10, 12 and 14 respectively in FIG. 1 is 4:2:1, and since the fractional resistance change is independent of thickness, then the magnitude of the change in resistance or output realized from the three films 10, 12 and 14 respectively has the ratio 1:2:4 or $$V_{14}=2V_{12}=4V_{10} \quad (4)$$

Thus if the resistance change of film 10 can vary + or − one unit, then the resistance change of film 12 can vary + or −2 units and the resistance change of film 14 can vary + or −4 units. If the films 10, 12 and 14 have their magnetic vectors 34, 36 and 38 all in the same direction as shown in FIG. 1 and if a pulse is applied to read line 16 of such polarity in magnitude as to cause each of the vectors to be rotated clockwise 45° to the position shown by vectors 40, 42 and 44 each of the films will have a maximum resistance as expressed previously by Equation 2. This means that the total change in resistance will be seven units or 4+2+1.

If the films 10, 12 and 14 have their magnetic vectors in the rest state as shown by vectors 34, 36 and 38 and if a pulse is applied to read line 16 of such magnitude in polarity as to cause the magnetic vectors of each of the films to be rotated counterclockwise to the vector positions 46, 48 and 50, each of the films will have a minimum resistance as expressed by Equation 3 above since the magnetic vectors are perpendicular to the magnetoresistive sense line. Thus, the total resistance change will amount to −7 units or the sum of −4, −2 and −1. It can therefore be seen that the total resistance change of the three films may vary from +7 units to −7 units in discrete evenly spaced units.

FIG. 3 is a table showing the relationship of the information stored in the three thin films in terms of the base 2 and base 8 systems as well as the magnitude of the magnetoresistive readout of the stored numbers. It can be seen that the resistance change and, hence, the output has a direct correlation to the information stored in the three films in question. The output is actually an octal number system. It is important to realize the direct readout of the stored information to an octal system is realized and conversion from binary to octal is not necessary. Thus if all three magnetic vectors are rotated to a position in which they are perpendicular to the sense line each of the films will have a minimum resistance or an arbitrary readout of −7 units as expressed above. If film 10 with the resistance change of +1 unit has its magnetic vector in a rest position 180° opposite to that of the other two, an applied magnetic field $H_1$, represented by vector 28 and caused by a pulse on the read line, will cause the two magnetic vectors of films 12 and 14 which have the same direction to be rotated to a position parallel to the sense line, thus causing a maximum resistance in the two films. At the same time the magnetic vector of film 10 which is initially in a direction opposite the other two will be rotated by the same transverse field in a direction perpendicular to the sense line thus causing that film to have a minimum resistance. Thus the first film (10) will have a resistance change of −1 unit, the second film (12) will have a resistance change of +2 units and the third films (14) will have a resistance change of +4 units. There will therefore be a total of +6 units −1 unit or a net total of +5 units which corresponds to a binary 110 as shown in FIG. 3. The remainder of FIG. 3 can be explained in a similar manner.

Thus it can be seen that a geometrical progression with a ratio of 2 in the film thickness yields a voltage change upon readout that has 8 discrete, evenly spaced levels depending upon the state to which each of the films is set.

Consider now the circuit arrangement of FIG. 2 wherein the thickness of film 52 is twice the thickness of film 54 and 4 times the thickness of film 56 thus forming a geometric progression of 4:2:1. The remanent magnetization of the films represented by vectors 58, 60 and 62 may rest either in the "0" or "1" state as indicated by arrows 74 and 76 respectively. Assume now that thin film 52 has its remanent magnetic vector 58 in the direction indicating a stored "1" while thin film 54 has its vector 60 initially at rest in a direction indicating a stored "0" and thin film 56 has its magnetic vector 62 initially in a rest state indicating a stored "1." If a transverse magnetic field $H_T$ is applied to each of the films in the direction shown by vector 70, it will be seen that magnetic vector 58 of film 52 will be rotated to a position indicated by vector 64, vector 60 of film 54 will be rotated to a position indicated by vector 66, and vector 62 of film 56 will be rotated to a position indicated by vector 68. Since magnetic vectors 64 and 68 of films 52 and 56 respectively are now aligned parallel with the sense line 72, it will be seen that the resistance of films 52 and 56 will be a maximum according to Equation 2 above. It will further be seen that since vector 66 of film 54 is perpendicular to sense line 72, the resistance of film 54 will be a minimum in accordance with Equation 3 above. Thus films 52 and 56 will have changed resistance in the amounts of +1 unit and +4 units respectively for a total of +5 units while film 54 will have changed a total of −2 units. The total output change in resistance will then be the sum of +4, −2, +1 or +3 units. As can be seen in FIG. 3, a change of +3 units is indicative of a 101 in the base 2 system stored in the three thin films which is equivalent to a 5 in the base 8 system.

It is obvious that anyone of the films may be set to a desired stable state by appropriately pulsing drive line 16 and a particular write line 18, 20 or 22 in FIG. 1.

Thus, as stated previously, it can be seen that the output is actually in an octal number system and that direct readout of the stored information to an octal system is realized; therefore, conversion from binary to octal is not necessary. The direct readout of the stored information could be accomplished by measuring or sensing the total resistance of the films which would vary from a minimum to a maximum in seven equal steps. It could also be accomplished by utilizing power supply 78 in FIG. 1 or 80 in FIG. 2 to supply a current through sense lines 24 and 72 respectively. By connecting an instrument 82 in FIG. 1 or 84 in FIG. 2 such as an oscilloscope or a Brush Recorder to the films, the change in voltage drop caused by the change in film resistance could be observed on the oscilloscope or recorded by the oscillograph. It is obvious that any device which can record or produce an indication of the seven equal steps of voltage change can be used as instrument 82 in FIG. 1 or 84 in FIG. 2.

Further the seven equally spaced voltage levels which range from −7 units to +7 units may easily be changed to all positive levels by merely adding +7 units to whatever value of units appears on the output line. Thus, the voltage level per unit is first determined by conventional means such as an oscilloscope or voltmeter. A direct current power supply is then constructed which will produce seven times the voltage-per-unit previously determined. The output of the power supply is attached to the output line 24 in FIG. 1 through a switch. Each time drive line 16 in FIG. 1 is pulsed, it simultaneously closes the switch connecting the output line to the power supply. For purposes of example, if the voltage developed on the output line by the thin films is −7 volts, by adding +7 volts with the power supply a net result of 0 volts is detected on the output line. Similarly, if −5 volts is developed by the thin films, −5+7=+2. Also, −3+7=+4, −1+7=+6, +1+7=+8, +3+7=+10, +5+7=+12 and +7+7=+14 volts. Thus, the output would range from 0 to 14 volts in the illustrative example in steps of +2 volts.

The above described arrangement need not be limited to three bits or films in one line but could be extended to 4 to form base 16, etc. However, the use of four or more films on a single sense line may lead to thickness problems, since each additional film must have a thickness which is one-half as thick as the thinnest film preceding it.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. A digital to analog converter wherein digital information stored in thin magnetic film elements is nondestructively readout and wherein each of said film elements has a variable resistivity with its maximum resistance inversely proportional to its thickness, said converter comprising:

*n* thin film elements each having a different thickness and each of which has a rotatable magnetic vector and two stable rest states, means for electrically connecting said elements in series to an output line, means coupled to said films for individually setting them to either of said stable states, said last named means including a single drive line coupled to said series of elements, and means for pulsing said drive line to rotate the magnetic vector of each of said films to produce one of $2^n$ voltage levels on said output line depending upon the state to which each of said films is set.

2. A device as in claim 1 in which the thicknesses of said films form a geometrical progression with a ratio of 2.

3. A magnetoresistive readout device comprising:

*n* bistable thin magnetic films having thicknesses $T_1$–$T_n$ forming a geometrical progression and having a rotatable magnetic vector, each of said films having a variable resistivity with its maximum resistance inversely proportional to its thickness, an output line for electrically connecting said films in series, means coupled to each of said films in said series for causing binary information to be stored therein, and single means coupled to all of said films for partially rotating said magnetic vector of each of said films to produce one of $2^n$ discrete evenly spaced voltage levels on said output line, said voltage level representing said binary information stored in said film.

4. The device of claim 3 wherein said geometric progression has a ratio of 2 defined by $$T_1=2T_2=4T_3=2^{n-1}T_n$$

5. The device of claim 4 wherein said output line is connected to each of said films at an angle of 45° in a predetermined direction with respect to said magnetic vector when the vector is in a selected one of its stable states.

References Cited

UNITED STATES PATENTS

| | | | |
|---|---|---|---|
| 3,030,618 | 4/1962 | Nilsson | 340—347 |
| 3,045,228 | 7/1962 | Bullock | 340—347 |

OTHER REFERENCES

Huijer: "Magnetoresistive Readout of Thin-Film Memories," Session IV: Memory, 1962 International Solid-State Circuits Conference.

"Magnetoresistive Readout for 200–NSEC TF Memory," Electronic Design (Mar. 15, 1962).

MAYNARD R. WILBUR, *Primary Examiner.*

DARYL W. COOK, *Examiner.*

J. H. WALLACE, G. R. EDWARDS, *Assistant Examiners.*